Oct. 24, 1933.　　　O. U. ZERK　　　1,931,946
BRAKE DRUM COVER
Filed Aug. 10, 1931　　2 Sheets-Sheet 1
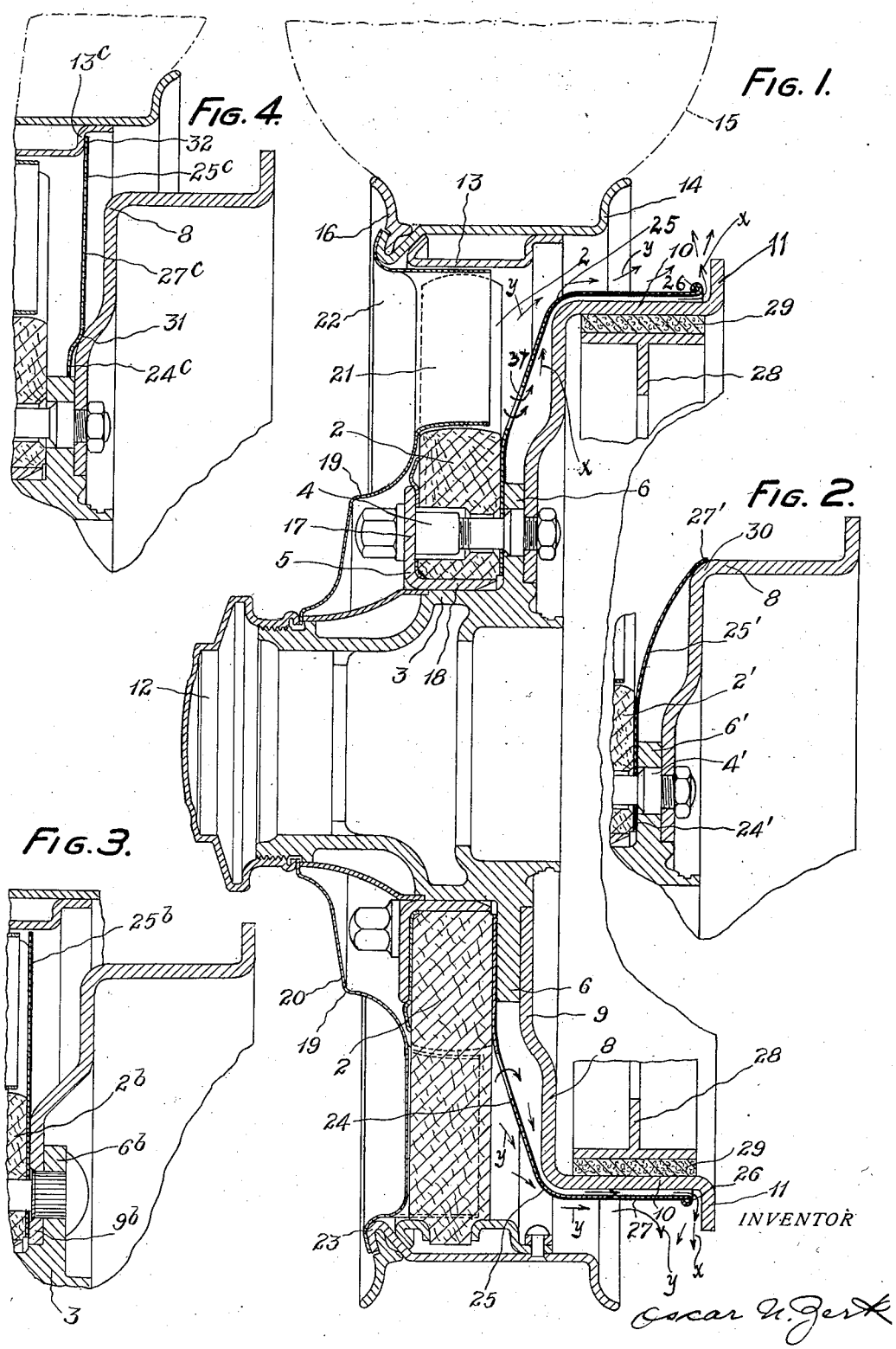
INVENTOR
Oscar U. Zerk Oct. 24, 1933.  O. U. ZERK  1,931,946
BRAKE DRUM COVER
Filed Aug. 10, 1931  2 Sheets-Sheet 2
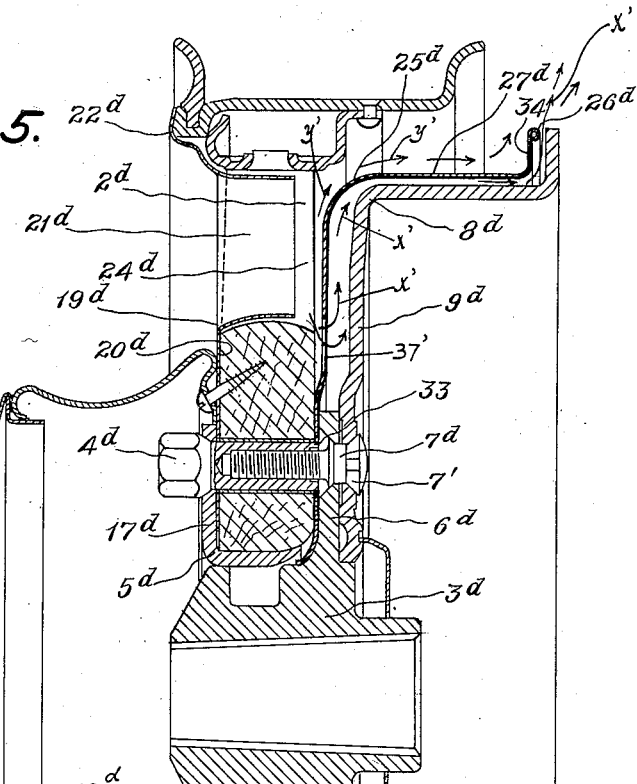
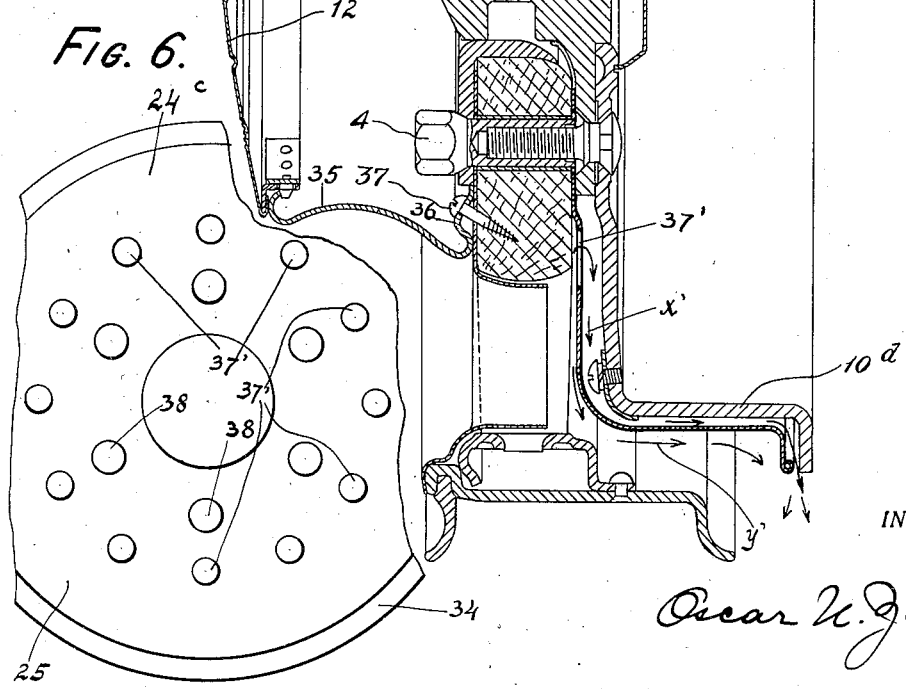
INVENTOR.
Oscar U. Zerk Patented Oct. 24, 1933

1,931,946

UNITED STATES PATENT OFFICE 1,931,946

BRAKE DRUM COVER

Oscar U. Zerk, Cleveland, Ohio

Application August 10, 1931. Serial No. 556,091

20 Claims. (Cl. 301—6)

My invention relates to brake drum covers for vehicle wheels.

Modern high powered and speedy automobiles must use powerful and effective brakes situated on all four wheels of the car. In order to make these brakes effective large diameter brake drums are used which have now substantially the same diameter as the inside diameter of the rim or felloe. These large brake drums, therefore, cover substantially the entire inside portion of an automobile wheel. The outer surface of brake drums is usually rough and dust and dirt will settle on this coarse surface very quickly and will give the brake drum and, therefore, the wheel a constantly unclean appearance, which is especially the case in connection with wire wheels which makes it very difficult to clean the brake drum from adhering dust and mud.

It is also a well known fact that brake drums heat up very quickly especially in mountainous countries and it is, therefore, important to dissipate the heat from the brake drums very quickly.

An object of my invention is to use a brake drum cover which when highly polished and chromium plated will not only give substantially the entire brake drum or at least the outside disc portion of the brake drum a substantially dustless and beautiful appearance, thus materially improving the appearance of the wheel fastened to the brake drum or to intermediate situated flanges, but also to provide improved brake drum covers of such a nature that the dissipation of heat from the brake drum is more rapidly effected.

Another object of my invention is to cover the disc and circumferential portion of the brake drum cover in an improved manner.

Another object of my invention is to fasten the brake drum cover in such a manner that it will not create any substantial noise while revolving with the wheel and brake drum.

Another object of my invention is to provide a highly presentable cover means for less presentable portions of an automotive vehicle wheel, having a brake drum affixed thereto.

Another object of my invention is to provide an improved wheel for motor vehicles having an improved æsthetic appearance, and wherein the brakes may be operated without undue heating of the brake drum.

Another object of my invention is to provide improved means for dissipating the heat from the brake drum of an automobile.

Another object of my invention is to provide, as an article of manufacture, an improved cover for brake drums which may be readily and inexpensively applied and which will not produce undesirable unpleasant sound effects during operation of the vehicle.

Other objects of my invention and the invention itself will be readily understood from the following description of certain embodiments of my invention, in which reference is had to the accompanying drawings in said embodiments.

In the drawings, Fig. 1 is a medial radial transverse sectional view of a wooden wheel of the artillery type comprising the wheel proper, the hub therefor, a brake drum affixed thereto and my improved cover for said drum together with a cover preferably employed to cover the wheel spokes;

Fig. 2 is a view otherwise like that of Fig. 1 of a second embodiment of my invention;

Figs. 3 and 4 are like views of still other embodiments of my invention;

Fig. 5 is a view otherwise like that of Fig. 1, of another embodiment of my invention;

Fig. 6 is a front elevational view of a brake drum cover such as that shown in Fig. 5 and illustrating the placement of apertures through brake drum covers like those in all of the different embodiments of the foregoing figures.

Referring first to the embodiment of my invention illustrated in Fig. 1, while the wheel may be of any of the usual types, I have herein illustrated my invention as applied to a wheel of the artillery type, having spokes 2 radiating from a common hub structure 3 and being rigidly secured thereto in relatively mortised relation by bolts 4 and clamp 5. The hub is provided also with an integrally formed radially extending annular flange 8 which is apertured at intervals to admit screw elements 7 for a purpose later to be described.

The wheel illustrated is preferably provided with the usual hub cap 12, felloe 13, tire rim 14, supporting the tire 15, in any suitable manner, such as the well known manner illustrated, whereby a removable clamping ring 16 cooperating with an opposite side flange of the tire rim securely holds the tire in place between said flanges.

The clamp 5 is of annular form and comprises a radial flange 17 and a tubular flange 18, the latter being press-fitted onto the outer cylindrical surface of the hub 3. The radial flange 6 of the hub is disposed in parallel spaced relation to the radial flange 17 of the clamp and the inner mortised ends of the spokes 2 are securely clamped between said flanges by virtue of a plurality of spaced bolts 4 projected through the flanges and said spoke ends.

To the outer face of the wheel as above described, I preferably affix a metallic sheet metal cover, 19, for the spoke portions of the wheel shown at 2.

The spoke cover illustrated is preferably of the type shown in my copending application Serial No. 540,306, filed May 27, 1931, although the present invention in its broader aspect is limited thereto, and therefore a brief description only of the said cover will be herein contained. Briefly, the cover comprises an inner annular portion 20, which is affixed to the hub preferably by being clamped between the hub cap 12 and a tubular extension of the hub 3, spoke covering portions 21 which are of arcuate channeled form and extending radially from the portion 20 embracing the different spokes 2 toward the rim portion of the wheel. Also, a circumferential rim covering portion 22 is preferably provided which interconnects the outer end of the spoke covering portion 21 and is itself of channel form in the circumferential direction, to conform with the outer surfaces of the rim portion 23 which are concealed thereby. A spoke and rim cover as above described is preferably maintained in spring-pressed contact with the rim portion 23 through the inherent resiliency of the cover itself by pressure maintained on the inner annular portion 18 by the clamping hub cap 12.

By virtue of the portion 20 of the spoke cover being clamped to the hub by the hub cap 12, the more or less unsightly heads of the bolts 4 are concealed, giving the front of the wheel a more presentable appearance.

A brake drum 8 is affixed to the wheel structure on its inner side, said drum being in the form of an annulus having a centrally perforated disc portion 9, a substantially cylindrical drum portion 10, and which preferably terminates in a radial flange 11.

According to the principles of my present invention, I now provide a cover for the brake drum and particularly for the forwardly disposed end wall 8 thereof, comprising an annular sheet metal element 25 which is in the form of a cup having a centrally perforated end wall 24 and a tubular side wall 27. The side wall 27 overlies the brake drum proper 10, being disposed outwardly therefrom in slightly spaced relation thereto and preferably terminates short of the radial flange 11 of the drum in an annular bead 26.

The side wall 27 is provided with a plurality of arcuately spaced apertures 37 equidistantly spaced from the axis of the disc 25, these adapted to admit air from the spoke side of the cover which is discharged peripherally thereof from the space between said cover and the brake drum as indicated by the arrows in Fig. 1 and also repeated in Fig. 5. A second series of apertures 38 disposed inwardly of the apertures 37 are provided to admit clamping bolts, as later described.

The bead 26 stiffens the rim of the cover 25 to prevent accidental contact between the cover of the drum which would otherwise during use of the vehicle employing the wheel cause an unpleasant rattling or ringing vibrational sound effect.

The cover 25 is preferably made of sheet steel and has a highly polished outer surface disposed toward the wheel spokes 2—2, and on the outer surface of the tubular portion 27, and I preferably chromium plate said outer surfaces of the cover, whereby the cover will form a highly polished metallic background for the wheel when viewed through the spokes or from a position forwardly or rearwardly and inwardly of the wheel.

In operation, a difficulty had with brake drums of automotive vehicles is that the drums are adapted to become heated to a high temperature whenever, through the operation of the brake shoes such as those shown at 28, the frictional brake lining 29 is pressed against the interior surfaces of the brake drum, said brake shoes and lining being stationary relative to the rotatable brake drum 10.

The energy effected by the frictional contact between the brake lining 29 and the inner surface of the drum 10 being converted into the form of heat, such a brake drum becomes highly heated and by conduction the heat reaches the end wall 9 of the drum and moreover heats the flange 6 of the wheel hub, being dissipated to some extent by radiation from the hub structure.

In the embodiment illustrated, a great deal of the heat is dissipated from the brake drum by conduction, and convection, first to the metallic sheet metal cover 24, and thence is dissipated to the air surrounding the cover 24 by the rotation of the wheel and cover carried thereby.

As above briefly referred to, during operative rotation of the wheel, the spaced portions of the spokes 2 will engage the air between the spokes and will displace said air forwardly and rearwardly of the spokes. The portion of air disposed rearwardly of the spokes is crowded in the space between the spokes 2 and the cover 25, and being under higher than thermostatic pressure in said space, is forced through the openings 37 in the cover disposed adjacent and to the rear of the spokes and then flows in the direction of the arrows such as X, shown in Fig. 1 outwardly radially and then between the superposed cylindrical portions of the cover 25 and the drum 10 and is expelled peripherally as indicated by the arrows from between the bead 26 of the cover and the peripheral flange 11 of the drum. These air currents carry away heat from the surfaces of the cover and drum engaged thereby and thereby contribute to the dissipation of the brake drum.

Also, air currents pass rearwardly from the spokes 2 in the direction of the arrows such as y, shown in Fig. 1, exteriorly of the cover 25 and cool the outer surface of the heat dissipating sheet metal cover element 25. The placement of the apertures 37 is substantially the same as those apertures shown at 37' in Figs. 5 and 6 for another embodiment of my invention later described.

I have illustrated in Fig. 1 only fragments of the brake shoes 28, but it will be understood that they are mounted on the stationary portion of the wheel axle in any suitable manner, and that the automotive vehicle chassis be provided with the usual pedal and/or hand-brake means for actuating the brake shoes carried on the axle portions of the chassis to effect frictional contact with the interior surfaces of the tubular brake drum portions in the usual manner under the control of the operator.

When the wheel for any reason is removed from the vehicle, the spoke cover 19 is preferably first removed by first removing the bolts 4, and then the cover 24 is removed, preferably with the wheel.

In the embodiment of my invention illustrated in Fig. 2, showing a fragment only of the wheel parts which otherwise are like those shown in Fig. 1, I show a variant form of brake drum cover in the form of a shallow cup 25' having a centrally perforated end wall 24' by which it is clamped by the bolt 4' to the wheel spokes 2' and the wheel hub flange 6' precisely like the end wall 24 of the cover of Fig. 1 is secured to the wheel.

The inner portion of the cover, which is of resilient sheet metal throughout, is substantially planular abutting against the inner planular surfaces of the mortised wheel spokes 2, and extends curvilinearly outwardly to its rim portion 27' which is spring-pressed, by the effect of the inherent resiliency of the cover against the portion 30 of the brake drum 8.

In the embodiment of Fig. 2, no effort is made to cover the tubular portion 10 of the brake drum, since such portion is only with difficulty viewable from the exterior of the vehicle and where the conditions arising from heating of the brake drum are inconsiderable, the extra radiating surface afforded by the smaller cover will be sufficient.

In the embodiment illustrated in Fig. 3, the brake drum cover is merely a planular centrally perforated disc 25b extending from the hub of the wheel where it is interposed between the spokes 2b and the inner portion of the end wall 9b of the brake drum. In this embodiment, the cover disc 25b and the brake drum end wall 9b are both securely clamped between the inner ends of the spokes 2b and the radial flange 6b of the wheel hub 3.

Both of the cover discs 25' of Fig. 2 and 25b of Fig. 3 are preferably chromium plated on their outer surfaces disposed toward the wheel spokes, or are given a preferably highly polished presentable appearance by other suitable surface means.

In the embodiment illustrated in Fig. 3, the heat from the brake drum conducted to the disc is effectively dissipated by the effect of air currents fanned by the spokes 2 and flowing outwardly radially in contact with the cover disc.

The embodiment of Fig. 4 is like that of Fig. 3, except that the inner planular portion 24c is not clamped to the wheel but is spring-pressed between the felloe 13c and an intermediate portion of the brake drum end wall, being deflected slightly inwardly thereby. The cover preferably has its inner portion outwardly off-set toward the wheel spokes relative to the portion 27c disposed towards the brake drum. Spring pressure engagement between the peripheral portion 32 of the cover and the lateral surface of the felloe 13c is effected by the inherent resiliency of the cover and the pressure exerted at 31 by the drum against the inner portion of the cover.

In the embodiment of Fig. 4, a substantially three-point annular contact is had by radially spaced portions of the cover disc with the wheel structure, the pressure contact at an intermediate point maintaining contact with the outer peripheral portion against the wheel felloe.

As in the foregoing embodiments, the surface of the cover disc disposed toward the wheel spokes is preferably chromium plated, and as a further feature of improvement in the embodiments of Figs. 3 and 4, I also contemplate sometimes applying a chromium plating to the opposite sides of the discs 25b and 25c respectively which is disposed toward the brake drum.

From the description of the foregoing embodiments, the embodiment of my invention illustrated in Fig. 5 will be readily understood wherein the wheel hub is shown at 3d, comprising a radially extending annular flange 6d perforated at intervals to admit screws 7d which are projected successively through the radial flange 9d of the brake drum 8d, said hub flange 6d, apertures 33 through the end wall disc 24d of the substantially cup-shaped brake drum cover 25, and finally into the interiorly threaded bore of the so-called bolts 4d. The bolts 4d are projected in the opposite direction successively through the radial flange 17d of the clamp element 5d, and the mortised ends of the spokes 2d which are securely clamped together by said bolt and screws between the clamp flange 17d and the hub flange 6d.

In this embodiment also, as a matter of preference, I may provide the end of the tubular flange 27d of the cover 25d with a terminal radial flange 34 which will preferably be provided with a terminal annular bead 26d.

Interposed between the flange 17d of the clamp 5d and the inner clamped ends of the spokes 2d I provide the sheet metal annulus 20d, affording the support for the spoke cover 19d, said supporting annulus being thereby tightly clamped by means of the bolt 4d and associated screws 7d securely between the clamped flange 17d and the hub flange 6d. As in the case of the first embodiment, the radiating channeled spoke embracing portions 21d extend substantially radially from the central supporting annulus 20d to make spring-pressed engagement by the rim cover portion 22d.

Also, in this embodiment, the hub cap 12d is removably secured in a well understood manner onto the outer end of a tube 35 having at its inner preferably larger end an inturned flange 36 through which by screws 37 or the like projected therethrough and into the inner ends of the wood spokes 2 to support the tube on the wheel.

In this embodiment, the drum cover 24d and the spoke and wheel cover 19d are securely clamped to the wheel by the same clamping means comprising the bolt and screws 4d and 7d by the compressive effect of the clamp and hub flanges 17d and 16d, respectively, effected by said bolt and screw inwardly towards the wood spoke ends.

When the braking mechanism, as in the foregoing figures, disposed within the drum in the usual manner, is operated to make frictional contact with the interior surface of the tubular flange portion 10d of the drum, thereby heating it, considerable of the heat thus generated will be conducted through the screws 7d and hub flange 6d to the hub structure and also the heat dissipating drum sheet metal drum cover element 24d, which is air-cooled on both of its sides by currents of air kept in movement by rotation of the wheel to promote a lower temperature for the drum.

As previously described for the first embodiment of my invention, the embodiment of Figs. 5 and 6 is also preferably provided with a plurality of apertures 37' disposed just to the rear of the spokes 2 when the cover is in place, and admits air put under slight compression by the rotary movement of the spokes through the air whereby the air will flow under pressure through the apertures 37', and outwardly as indicated by the arrows such as x' to be expelled at the adjacent peripheral flanges 34 and 26d, respectively, of the cover and drum. Also, as in the foregoing embodiment, other air currents will be forced over the outer surface of the heat dissipating cover 25d as indicated by arrows such as y' to cool the outer surface of said cover.

The outer surface of the tubular flange 27d and the face of the disc portion 24d of the cover 25d will preferably be chromium plated or otherwise given a polished surface, so that such portions thereof as are viewable between the spokes 2d will have a presentable appearance.

Although I have illustrated and described herein wheels having wood spokes, it will be understood that my invention in at least its broader phases is susceptible to embodiment in wheels having metal spokes or being of the disk type, apertured intermediate the hub and rim portions, whereby except for the sheet metal cover acting as a mask or trim for the brake drum, the more or less unsightly brake drum would have been exposed to view, but through which apertures the highly finished and substantially ornamental cover or trim is by virtue of my invention viewed through said apertures.

Therefore, in the appended claims, it will be understood that where I refer to "spoke wheels" or to "spokes", I contemplate within such terms all forms of wheels having such apertures, and any and all substitutes for the wood spokes of the wheels illustrated, such terms being used in the broadest sense.

Having thus described my invention, I am aware that numerous and extensive departures may be made from the embodiments herein illustrated and described, but without departing from the spirit of my invention.

I claim:

1. In combination with a vehicle wheel, a brake drum supported by the wheel and an ornamental cover therefor, said cover interposed between opposing surfaces of the drum and the wheel and affixed to said wheel at an inner portion of the cover and substantially spaced from the drum at all portions outwardly of the inner portion and providing an annular air flow space between the cover and the drum.

2. In combination with a vehicle wheel of the artillery type, a brake drum supported by the wheel and a cover therefor, said cover interposed between opposing surfaces of the drum and the wheel and affixed to said wheel at an inner portion only of the cover, said cover disposed between said drum and the spoked portion of the wheel and apertured adjacent the wheel spokes.

3. In combination with a vehicular wheel, a substantially cup-shaped brake drum, a cover therefor comprising a centrally perforated metal cup, said cup comprising radially spaced innermost and peripheral portions, affixed to an inner lateral side of the wheel by its said inner-most portion, said cover interposed between the wheel and the end wall of said drum to cover said drum end wall, and spaced from said drum at all portions outwardly of the innermost portion to prevent vibrating contact of said outer portions therewith during operation of the vehicle and providing an air flow space between the cover and the drum.

4. In a vehicle wheel, a wheel hub, spokes radiating therefrom and secured thereto, an annular radial flange integral with said hub, a brake drum in the form of a cup comprising a centrally perforated end wall and a tubular side wall, a brake drum cover substantially covering at least the disc portion of the brake drum situated between the wheel and the tubular side wall of the drum, and means to secure said cover and spokes together with the end wall of said drum to said flange.

5. In a vehicle wheel, a wheel hub, spokes radiating therefrom and secured thereto, an annular radial flange integral with said hub, a brake drum in the form of a cup comprising a centrally perforated end wall and a tubular side wall, a brake drum cover substantially covering the openings between the spokes of the wheel and the rim, said cover being apertured in portions adjacent said spokes to admit air under pressure effected by movement of said spokes during rotation of the wheel to the space between the drum and the drum cover to cool the opposing surfaces of the drum and cover, and means to secure said cover and spokes and the end wall of said drum to said flange, said cover being disposed between the brake drum and the wheel spokes.

6. In combination with a wheel and a substantially cup-shaped brake drum affixed by an end wall thereto, a drum cover covering at least the disc end wall portion of the brake drum, and disposed between said drum and a peripheral portion of the wheel, said cover being spring-pressed therebetween and maintaining contact therewith by the inherent resiliency of the material of the cover reacting against the pressure exerted by the contacted parts of the drum and wheel.

7. The combination of a wheel of the artillery type, a brake drum and a highly polished brake drum cover, covering at least the disc portion of the brake drum and substantially bridging the openings between the wheel spokes, said brake drum cover being apertured in portions adjacent the spokes and disposed between the wheel and the drum, said apertures adapted to receive air currents set up by the spokes and traversing the space between the cover and drum to cool the opposing surfaces thereof.

8. The combination of a brake drum, a brake mechanism disposed within the drum adapted for frictional contact therewith, a wheel carrying the drum, a brake drum cover of metallic material comprising a disc portion placed between the wheel and the drum substantially covering at least the disc portion of the brake drum and spaced therefrom in all radially outer portions to provide an air flow space between the cover and the drum and joined thereto in a manner to abstract heat therefrom, in radially inner portions, said cover conducting heat to the said outer portions to be dissipated thereat to reduce the temperature of said drum.

9. The combination with a motor vehicle chassis, and the wheels supporting said chassis, a brake drum carried on the inner side of at least one of said wheels and rotatable therewith braking mechanism disposed within the drum and adapted for operation to make frictional contact with the inner cylindrical surface thereof, and a sheet metal plate disposed between the brake drum and the wheel and thermally joined to the drum and the wheel at its inner portions to conduct heat therefrom, said plate being spaced from said drum in outer portions and adapted to be cooled by air currents, said air currents set up by rotary movement of the wheel, passing between said wheel and said plate on the one side and between said plate and said drum on its other side.

10. In combination with a vehicle wheel of the spoked type and a brake drum affixed to the inner side thereof and rotatable therewith, a sheet metal cover of integral construction affixed to the outer side of the wheel and comprising radially extending spoke embracing arms presenting the appearance of finished metallic spokes and a second sheet metal plate disposed between said spokes and the brake drum and having all outer portions substantially spaced from said drum and common clamping means for securing both of said plates to the hub portion of the wheel.

11. A vehicle wheel of the spoked type, a brake drum secured to an inner side thereof, an ornamental sheet metal cover for said drum disposed in relatively nested relation thereto, cover means for the spokes embracing the outer surfaces thereof, and common securing means to secure said cover means and said drum cover to the wheel.

12. A vehicle wheel of the spoked type, a brake drum secured to an inner side thereof, an ornamental sheet metal cover for said drum spaced therefrom in outer portions, and independent cover means individually covering each of said spokes and embracing the outer surfaces thereof.

13. A vehicle wheel of the spoked type, a brake drum secured to an inner side thereof, an ornamental sheet metal cover for said drum spaced therefrom in outer portions, cover means individually covering the spokes and embracing the outer surfaces thereof, and common securing means to secure both said cover means, and said drum to the wheel.

14. A vehicle wheel of the spoked type in combination with a brake drum affixed to a side thereof and rotating therewith, of a cover for said brake drum interposed between the spokes of the wheel and the drum, comprising an annular disk of sheet material comprising an inner portion bordering its central opening, and a peripheral portion, and means to secure said cover to the wheel by one only of said portions.

15. A vehicle wheel of the spoked type in combination with a brake drum affixed to a side thereof and rotating therewith, of a cover for said brake drum interposed between the spokes of the wheel and the drum, comprising an annular disk of sheet material comprising an inner portion bordering its central opening, and a peripheral portion, and means to secure said cover to the wheel by said inner portion only.

16. A vehicle wheel of the spoked type in combination with a brake drum affixed to a side thereof and rotating therewith, of a cover for said brake drum interposed between the spokes of the wheel and the drum, comprising a perforated annular disk of sheet material comprising an inner portion bordering its central opening, and a peripheral portion, said disk being of inherently resilient material and constrained by contacting portions of said wheel and drum to other than to normal form and retained by the retractive effort exerted by said disk against said wheel and drum portions while attempting to regain its normal unstressed form.

17. The combination of a vehicle wheel, said wheel being apertured in its portion intermediate the hub and rim, a brake drum disposed at the inner side of the wheel, and a trim for the drum in substantially the form of a disk disposed inwardly of the apertured wheel portion and substantially masking surface portions of said drum otherwise exposed to view through the wheel apertures.

18. The combination with a vehicle wheel apertured in portions intermediate its rim and hub portions, of a brake drum therefor secured thereto on the inner side of the wheel, a sheet metal cover in substantially the form of a disk interposed between said wheel and drum and masking the outer surface of the drum from view through said wheel apertures.

19. The combination substantially as set forth in claim 18 characterized by said cover having a substantially tubular portion encircling peripherally outer portions of the drum.

20. The combination substantially as set forth in claim 18 characterized by said drum and cover secured to said wheel radially inwardly of said apertured wheel portion.

OSCAR U. ZERK.